Figure 1:
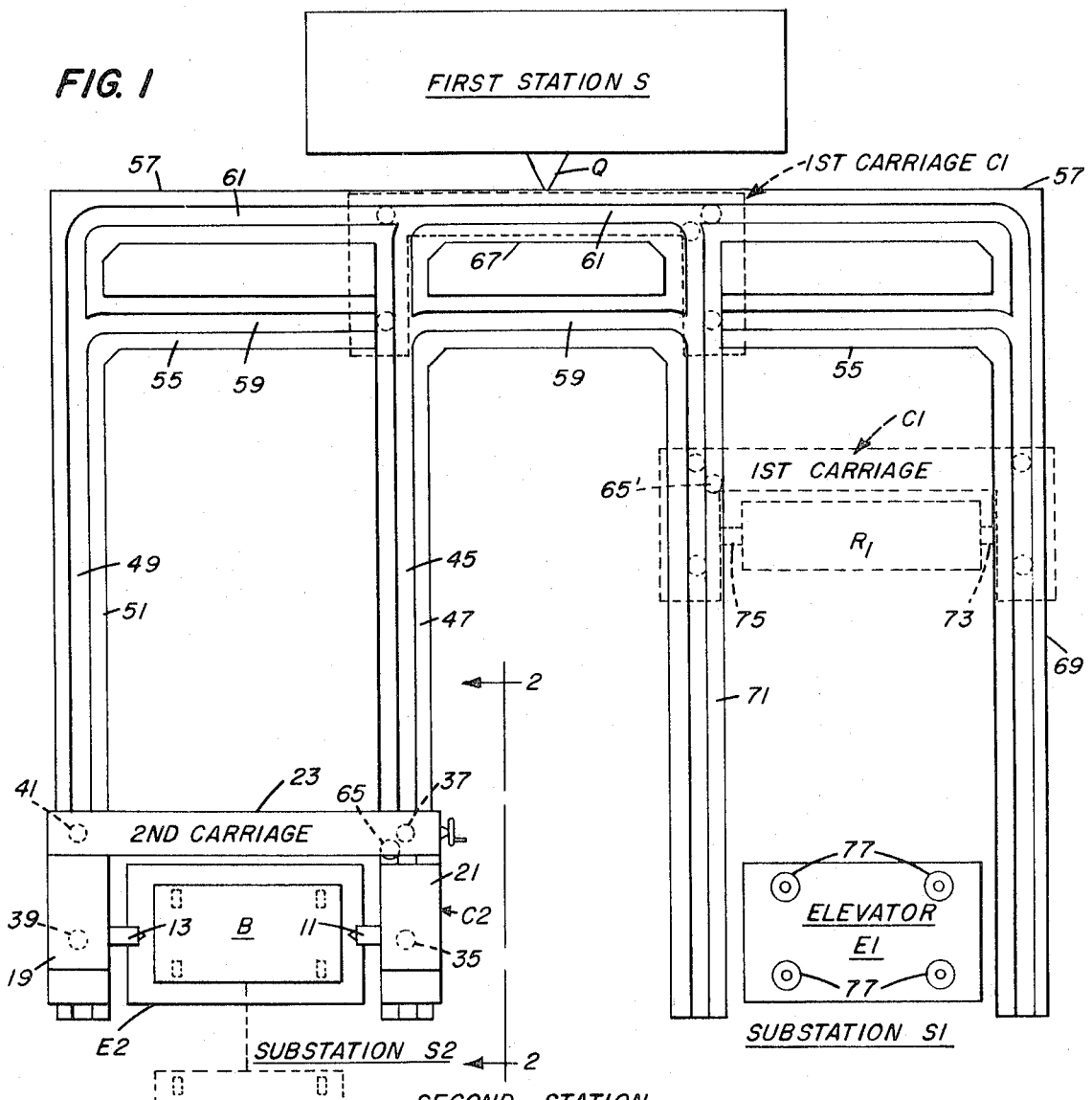
Figure 2:
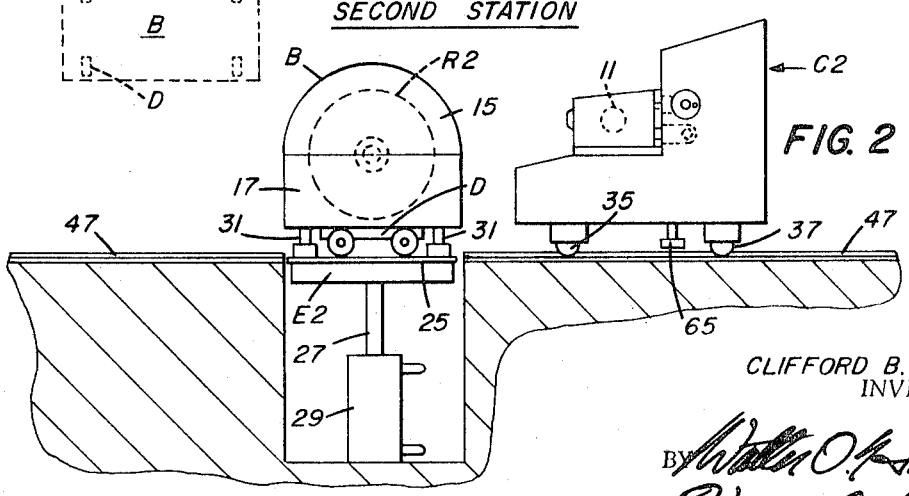

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 4

T887,003
ROLL DEBOXING AND TRANSPORTING APPARATUS

Clifford B. Bushnell, 1669 Lake Ave., Rochester, N.Y. 14650

Filed Feb. 16, 1970, Ser. No. 11,566
Int. Cl. B65g *47/00*
U.S. Cl. 214—622
1 Sheet Drawing. 9 Pages Specification

Apparatus for conveying rolls of photographic film or paper between a first station (such as a slitter S) and a second station (such as a storage area) comprises two identical loading or unloading substations S1 and S2, and separate carriages C1 and C2 having ball casters running in grooved tracks for engaging rolls R1 and R2 and carrying them to slitter S. The tracks comprise a single pair 55, 57 adjacent to and centered on the slitter, and extending laterally in opposite directions therefrom; and two other pairs 47, 51 and 69, 71 extending to substations S1 and S2 at right angles from, and connecting smoothly to, opposite ends of tracks 55, 57. Carriage C2 is U-shaped and encloses a hydraulic elevator E2 on three sides, upon

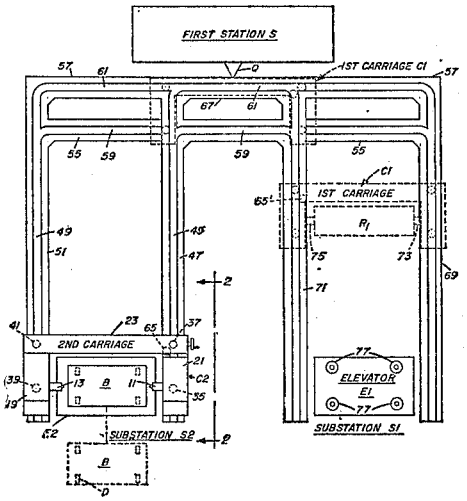

which a dolly carrying a boxed roll is run and is then lifted up so that gudgeons 11, 13 engage the ends of the roll. Gudgeons 11 and 13 are movable toward and away from one another. Levelling jacks 31 on elevator E2 provide fine positioning of the box B and the roll R2. Then the elevator is lowered so that box B and dolly D can be rolled off the elevator. Each carriage is provided with a downwardly extending guide wheel which engages a cam surface 67 adjacent slitter S to keep the carriage rolling in a straight line.

June 1, 1971 C. B. BUSHNELL T887,003

ROLL DEBOXING AND TRANSPORTING APPARATUS

Filed Feb. 16, 1970

CLIFFORD B. BUSHNELL
INVENTOR.

BY Walter O. Hodsdon
Henry M. Chapin
ATTORNEYS